United States Patent [19]

Simonyi et al.

[11] Patent Number: 4,896,565
[45] Date of Patent: Jan. 30, 1990

[54] PROCESS FOR THE GEAR CHANGE OF THE AUTOMATIC TRANSMISSION OF MOTOR VEHICLES CONTROLLED WITH AN ELECTROHYDRAULIC VALVE SYSTEM

[76] Inventors: Sándor Simonyi, Salgotarján; László Töröcsik, Budapest; István Tóth, Salgotarján; György Válóczi, Salgotarján, all of Hungary

[73] Assignee: Csepel Autogyár, Szigelszenlmiklós, Hungary

[21] Appl. No.: 187,497

[22] Filed: Apr. 28, 1988

[30] Foreign Application Priority Data

May 15, 1987 [HU] Hungary ............... 2176/87

[51] Int. Cl.⁴ ............ B60K 41/22; F16H 45/02; F16D 47/02
[52] U.S. Cl. .................. 74/731; 74/733; 192/3.31
[58] Field of Search ........... 74/731, 733, 732; 192/3.28, 3.31

[56] References Cited

U.S. PATENT DOCUMENTS 3,693,479  9/1972  Toyoda et al. ............... 74/731
3,713,351  1/1973  Sakakibara et al. ........... 74/731

FOREIGN PATENT DOCUMENTS 61-65962  4/1986  Japan ........................ 74/733
2150657   7/1985  United Kingdom ............. 74/731

*Primary Examiner*—Leslie A. Braun
*Assistant Examiner*—David A. Testardi

[57] ABSTRACT

A process for controlling an automatic transmission wherein engine speed and output speed are measured and the slip conditions are derived therefrom. When conditions of downshift occur, as determined by excessively high slip and/or excessively low speed, the conditions existing at the moment of downshift are evaluated, and a comparative slip signal is derived and saved. This signal is employed as reference relating to the momentary slip conditions of the vehicle for use in determining the proper moment for a subsequent upshift. Thus, conditions for an upshift, following a particular downshift, are modified as a function of the circumstances requiring the downshift (e.g. normal deceleration, overtaking another vehicle, ascending a hill). Procedures are also included for enabling engagement of a friction clutch, for bypassing the torque converter of the transmission, under certain conditions in advance of an upshift.

8 Claims, 15 Drawing Sheets

PROCESS FOR THE GEAR CHANGE OF THE AUTOMATIC TRANSMISSION OF MOTOR VEHICLES CONTROLLED WITH AN ELECTROHYDRAULIC VALVE SYSTEM

BACKGROUND AND SUMMARY OF THE INVENTION

The invention relates to a process by which optimal shifting points of an electrohydraulically controlled automatic transmission can be determined.

It is a well known fact that, in automatic transmissions, the decision making of the driver is taken over by automatic controls. Initially, only one single value of upshifting or downshifting velocity was established for the individual gears. However, these controls were unable to consider either loading of the motor vehicle, or ascent or intention of overtaking. Accordingly, several solutions have been developed for making controls more sensitive.

As is apparent from one of the articles of the periodical, Avtomobiljana promüslennoszty 1986/2, with Soviet GMP automatic transmissions the loading range of the motor was divided in three sections. That means technically that the stroke length of the gas pedal is divided into three sections, and different points of gear change are defined for each section. Essentially a similar solution is described in the Patent U.S.-PS No. 4,468,987. In this case, too, conclusion is drawn from the position of the throttle pedal in respect to the load, while a series of points of gear change was defined for the unloaded, loaded and braking state. However, these solutions are not able to consider properly the intentions of the driver to accelerate the vehicle.

The solution according to the U.S.-PS No. 4,414,863 represents a more complete arrangement. With this system, in addition to the separation of loading sections, gear change is made softer by delayed shifting. A further advantage is that a program is provided for acceleration, which hinders down shifting after having already shifted up in course of acceleration. In this case "full extension" of the motor is achieved.

The solution according to the German DE-PS 1,580,011 considers loading in a quite different way. In this case electric signals formed from the position of the throttle pedal and velocity are added, and on the basis of the sum obtained the system selects the proper series of points of gear change.

With these systems it has been tried to approach ideal ways of driving so that more and more series of points of gear change were determined. The German Patent Specification DE-OS 2,756,719 gives an example for a solution which was developed for earthwork machines. Special series of points of gear change were determined for the operation on highways and in the performance of work.

Similar solutions are disclosed in the German Patent Specifications DE-PS 1,958,944 and DE-PS 2,424,607, as well as in the U.S.-PS No. 4,263,826. A most interesting feature of the last-mentioned is that complete control is realized hydraulically and the load is examined on basis of the number of revolutions of the motor.

The German Patent Specification DE-PS 1,954,783 gives a solution for further possibilities of correction. With this solution the driver may increase the automatically selected points of gear change by means of a change-over switch.

According to the solution as specified in the German Patent DE 2,013,079 the driver may influence control during the ascent. At the same time, the control itself considers certain changes in traffic conditions, such as the angle of the slope acceleration of the vehicle, and curvature of the road.

With the solution according to U.S.-PS No. 4,044,634 a detector measures the acceleration of the vehicle. In a case of intense acceleration, the control does not change up to a higher gear.

In addition to determining the points of gear change, another problem used to arise in connection with automatic transmissions. In the course of a gear change, the number of revolutions of the crankshaft of the motor will be different from the number of revolutions of the driving shaft of the transmission, so that inelastic operation and impulsive loads can occur. With one known solution, clutches are operated with delay, meanwhile the number of revolutions of the motor is readjusted. Readjustment used to be performed generally during a period of constant value. The specification of GB-PS 2,087,005 discloses a more sensitive control, at which the speed of closing and opening of the short-circuiting clutch is regulated as a function of the extent of throttling, of the velocity of the vehicle and of gear change.

The solution according to the German Patent Specification DE 2,537,006 represents a further trend of development, which is well suitable for both the short-circuiting and gear changing clutches. With this solution the pressure of the hydraulic liquid is controlled in accordance with the loaded state of the motor. Conclusions on the load are drawn from the position of the throttle pedal and the number of revolutions of the motor. Additionally, the driver may influence the situation by means of a switch.

From the survey of the different tendencies of development, it has not been possible to determine the optimal points of gear change. For solving the resulting problems, better or worse solutions were proposed. However, even the best solutions require special commands for changing or completely eliminating general control programs under special conditions, such as ascent, overtaking, etc.

An objective of the present invention is finding the solution for the optimal control, by which ideal points of gear change can be determined for every condition of loading. That means ideal points of gear change, as could be determined by the driver in course of manual gear change.

The solution of the invention is based in part on the recognition that neither the position of the throttle pedal nor the extent of throttling express accurately the real state of loading, as the actual torque delivered by the motor also depends on the prevailing number of revolutions. As a matter of fact, the possibility or necessity of gear change depends on the extent to which the torque delivered by the motor is meeting the requirement of torque which is needed for travel of the vehicle in accordance with the intentions of the driver. Accordingly, the two torques enable a conclusion on the actual load, and said conclusion can be drawn most advantageously from the input/output numbers of revolutions of the hydrodynamic torque converter.

A further recognition is that, if changes in the load and causes are continuously analyzed, correction of the points of gear change is to be performed continuously but only to the extent necessary.

Accordingly, the invention relates to process for the gear change of the automatic transmission of a motor vehicle. From signals characterizing the r.p.m. of the motor and the output of the transmission a slip signal proportional with the slip of the torque converter is generated. Thereafter this slip signal is compared in an evaluating unit to a predetermined upshift slip signal and to a predetermined downshift slip signal. If the signal of r.p.m. exceeds the signal of the upshift r.p.m., and the slip signal is reduced below the predetermined upshift slip signal, a command signal for upshift is given to the electromagnetic valves of the transmission. Thereafter, if the chosen signal of r.p.m. falls below the predetermined downshift signal, or the slip signal exceeds the slip signal for downshifting, a command signal is given for shifting into a lower gear.

With a preferred mode of realization of the process according to the invention the signal characterizing r.p.m. of the motor, or the signal characterizing output r.p.m., is compared in a comparator with a signal characterizing the desired r.p.m. for direct engagement of the friction clutch or with a predetermined signal characterizing the value of the r.p.m. for releasing the clutch. The slip signal is also compared with a predetermined slip signal characterizing the slip value of clutch engagement. If the chosen signal of the number of revolutions exceeds the signal characterizing the clutch engagement r.p.m. and if the slip signals falls below the slip signal of clutch engagement, a command signal is given for closing the friction clutch. If the chosen signal of r.p.m. falls below the signal characterizing r.p.m. for releasing the clutch, a corresponding command signal is emitted.

With another preferred mode of realization of the process according to the invention the signal characterizing output r.p.m. or the signal characteristic for the r.p.m. of the motor is fed into a memory. Thereafter, by using the downshift command signal of the gear change control unit, the signal corresponding to the momentary r.p.m. at downshift is stored. Thereafter, by the aid of the unit forming the comparative slip signal, the upshift slip signal and/or the clutch engagng slip signal is reduced by a correction value depending on the stored signal of r.p.m.

With the third possible mode of realization of the process according to the invention the signal characterizing the output r.p.m. or the signal characterizing the r.p.m. of the motor is fed into a memory. By using the downshift command signal of the gear change control unit the signal characterizing momentary r.p.m. at downshift is stored. Thereafter, by the aid of the unit forming the comparative signal of r.p.m., the signal of upshift r.p.m. and/or clutch engaging r.p.m. signal is increased by the correction value depending on the stored signal characterizing momentary r.p.m. at downshift.

With the fourth advantageous mode of realization of the process according to the invention in the unit evaluating the number of revolutions, upon the downshift command signal of the gear change control unit, by increasing the signal of r.p.m. of upshift and/or the signal of r.p.m. of clutch engagement by predetermined value, comparison is performed with a signal with increased severity characterizing increased r.p.m. of upshift, and/or with the signal with increased severity characterizing increased clutch engagement r.p.m.

With the fifth preferable mode of realization of the process according to the invention, in the slip evaluating unit, upon the downshift command signal of the gear change control unit, the upshift slip signal and/or clutch engagement slip signal is reduced by a predetermined value. Subsequent comparisons are therefore performed with an upshift slip signal of increased severity and/or with a clutch engagement slip signal of increased severity.

In a sixth possible mode of realization of the process according to the invention, a signal characterizing the change in output r.p.m. is generated, or a signal characterizing the change in the number of revolutions of the motor is formed. Optionally, from the slip signal, a signal is generated which is characteristic of the change in load. Thereafter, upon receiving a downshift command signal, a constant "normal" upshift signal is formed if (i) either the signal characterizing the change of output r.p.m. or the signal indicating the change of r.p.m. of the motor is negative and (ii) the signal of the r.p.m. of the motor is below a limit value, or the signal indicating a change in load is negative. If there is (i) a positive signal characterizing the change in output r.p.m. or a positive signal characterizing the change in r.p.m. of the motor, and (ii) the signal of the r.p.m. of the motor is above the limit value for downshift or there is a positive signal indicating change in load, a constant "overtaking" upshift slip signal is generated. Finally, with (i) a signal indicating a negative change in out r.p.m. or with a negative signal characterizing change in r.p.m. of the motor, and (ii) a signal of r.p.m. of the motor lying above the limit value or a signal indicating a positive change in load, a constant "ascent" upshift slip signal is selected, and in the comparator the actual slip signal is compared with them.

With a seventh possible mode of realization of the process according to the invention, when a downshift command signal is derived from a negative signal characterizing change in output r.p.m. or from a negative signal indicating change in r.p.m. of the motor, and the signal of r.p.m. of the motor is above a limit value, or there is a positive signal referring to change in load, a constant "ascent" upshift signal is formed. In any other case, a constant "normal" upshift slip signal is generated, and the actual slip signal is compared to said signal in the slip evaluating unit.

Finally, with a preferable mode of realization of the process according to the invention, the upshift slip signal and the clutch engagement slip signal are identical. If the slip signal is below the upshift slip signal and the selected signal of r.p.m. is above the upshift r.p.m. signal, simultaneously with the upshift command signal an inhibiting signal is forwarded to the clutch engagement control unit.

BRIEF DESCRIPTION OF THE DRAWINGS:

The invention will be described in detail by means of some preferable versions of the process, in conjunction with the accompanying drawings, wherein.

DESCRIPTION OF PREFERRED EMBODIMENTS:

The process according to the invention can be realized in a plurality of versions and it goes without saying that it can be well used for automatic transmissins based on different systems.

For the actual realization of the invention an electronic unit was developed, which can be adapted to any version of the process and any type of automatic transmission depending on the program fed to the unit. Initially, we shall describe the basic version only, and with the other embodiments we shall refer only to the differences. For the sake of order it should be mentioned that for facilitating comprehension first of all more simple phases of the process will be described followed by the more complicated steps, every version will be explained by means of the basic scheme. For this reason block schemes were drawn so that their super position could be appreciated visually, too.

Figure 1:
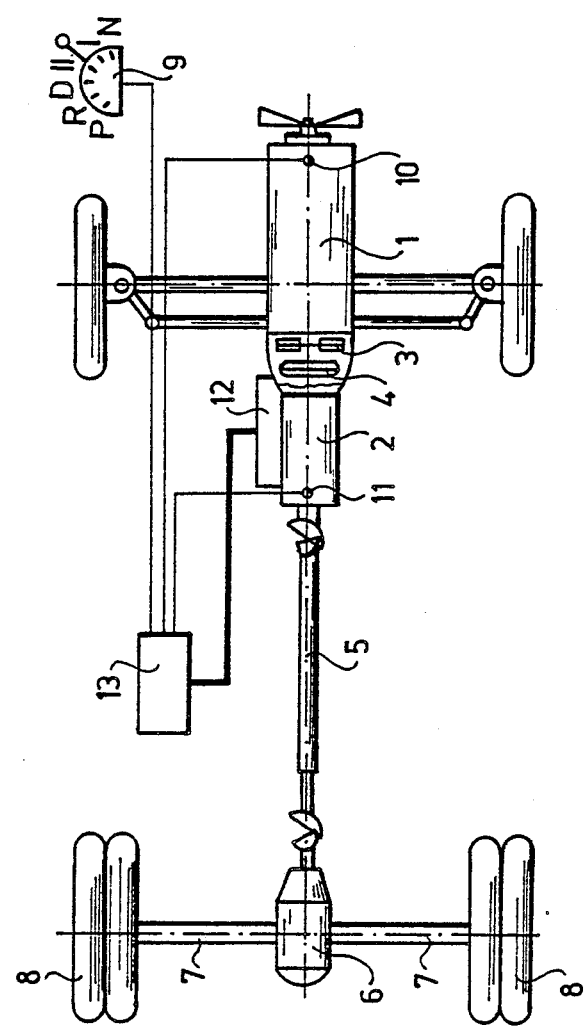
FIG. 1 is the diagram of the drive train of an autobus.
Figure 2:
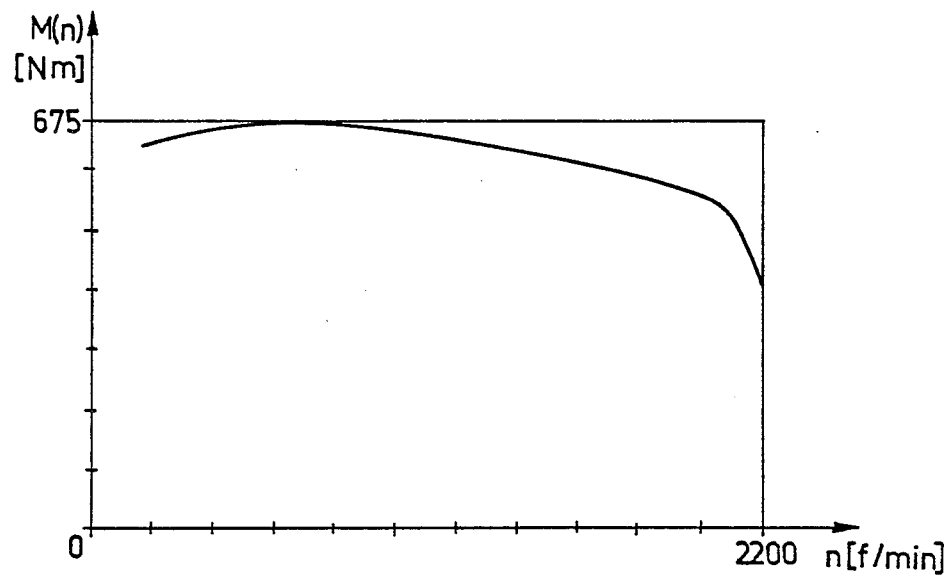
FIG. 2 is a diagram torque vs r.p.m. of the motor.

The actually-realized version of the process as developed for an autobus travelling in city traffic. As shown in FIG. 1, the motor 1 is the power source of the bus. A suitable motor 1 is a six cylinder Diesel motor with an output of 140 kW. FIG. 2 illustrates the torque diagram as a function of the number of revolutions M(n). The number of revolutions (r.p.m.) of the motor at idle speed ($n_a$)=500–550 revolutions per minute; the lowest operative r.p.m. ($n_{ümin}$)=880 r.p.m.; the highest operative r.p.m. ($n_{ümax}$)=1800 r.p.m. and the highest r.p.m. ($n_{max}$)=2000 r.p.m.

A transmission 2 is driven by the motor 1. The transmission 2 is an automatic transmission with a transmission layshaft, operating with three forward gears and one reverse gear. The gear ratios of the various gears is: low 2.43; second 1.44; high 0.98 and reverse 1.97. Drive shaft of the transmission is connected to the crankshaft of the motor 1 through the hydrodynamic torque converter 4, and a friction clutch 3 capable of short circuiting it. The gear ratio of the hydrodynamic torque converter 4 may change between 1 and 2.6. Gear change and releasing-closing of the friction clutch 3 are controlled by electromagnetic valves 12.

Typical values of the average velocity of the gear changes are as follows: when shifting into the second speed, 10–20 km/h, when shifting to high speed 20–40 km/h, when changing back to the second speed 20–25 km/h and into low gear 10–15 km/h. Maximum speed of the bus: 80 km/h.

The output shaft 5 of the tranmission 2 is connected to a differential gear 6, which is connected to the wheels 8 via half axles 7. These units form the drive train of the autobus.

It should be mentioned that the process according to the invention is suitable also for passenger cars. As it is well known with passenger cars provided with frontal drive or rear engine, generally the transmission and differential units are built together, in which case the drive train does not comprise a cardan shaft.

An electronic control unit 13 controls the electromagnetic valves 12. Information needed for such control is generated with signal transmitters. One of the most important information inputs for gear shifting lies in determining which way the driver intends for a gear change to be performed.

The shift control 9, for selecting the transmission setting, may be formed as a lever or with a push button.

Figure 4:
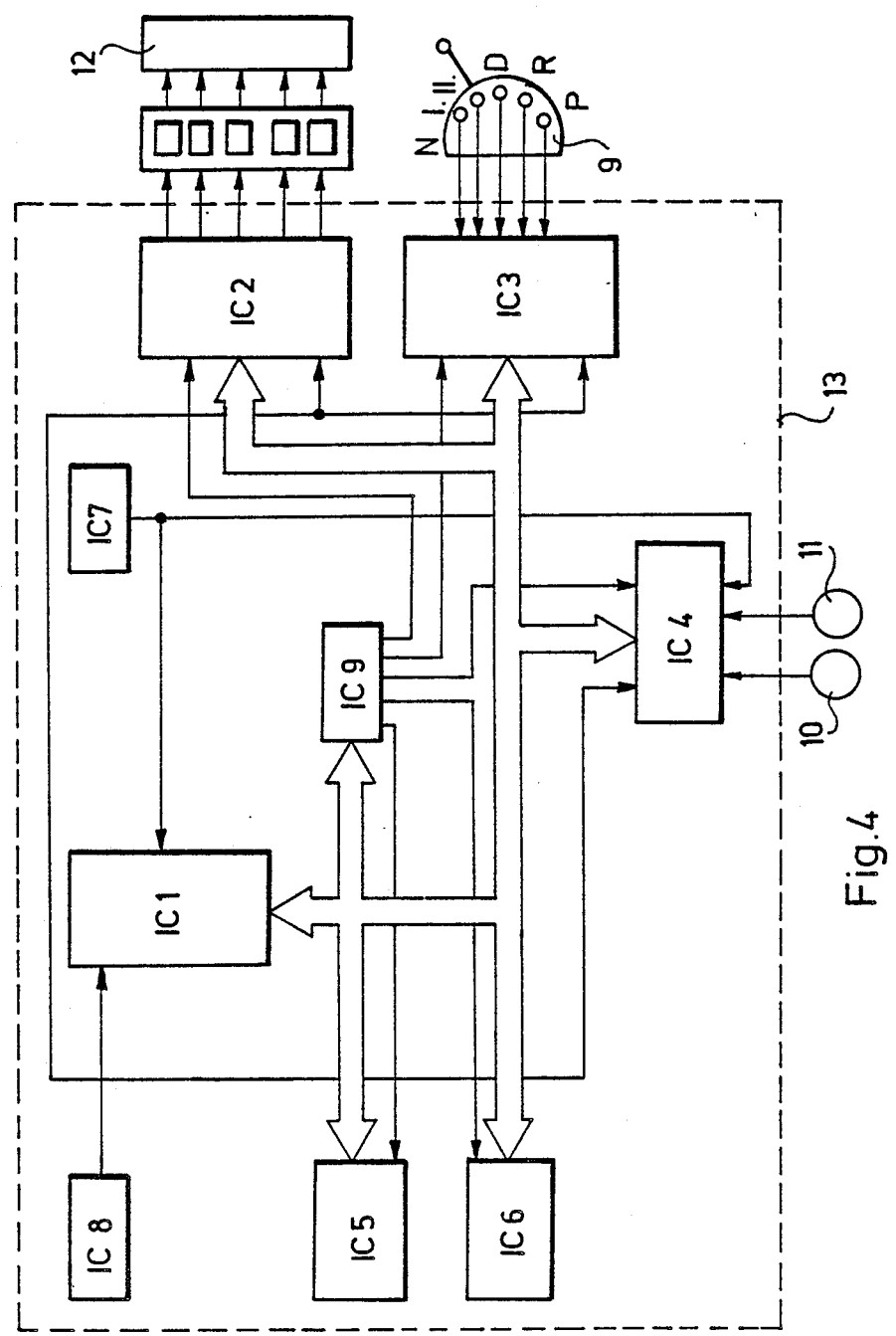
FIG. 4 is the circuit arrangement of a possible version of electronic control unit for realizing the process of the invention.

The folowing conditions of gear change can be established in the proper gear shifting positions:

In the neutral position "N", no gear is engaged. In the position I, the transmission 2 shifts not higher than the bottom gear, in the position II, not higher than the second gear, in the position "D" any gears can be engaged, while in the position "R" only the reverse gear is engaged. Generally gear selector switches 9 are provided with a further gear shifting possibility. This serves for changing to the parking brake position "P". The outputs of the selector switch 9 are connected to the corresponding inputs of the electronic control unit 13 as indicated in FIG. 4.

The second information needed for the control is the number of revolutions of the motor 1. This is provided by an electric signal transmitter 10 connected to the input of the control unit 13. Transmitter 10 is preferably installed in association with the camshaft of the motor 1. The gear ratio 1:2, of the camshaft related to the crankshaft, is considered in the electronic control unit 13.

Finally, the third information required for control is the number of revolutions of the power take-off drive shaft of the gear part of the transmission 2. Although this r.p.m. can be measured, a more simple solution is available. Every transmission has a speedometer drive, which is well suitable for generating electric signals. However, these must be modified with the gear ratio of the just operated gear. Accordingly, an r.p.m. signal transmitter 11 is installed in association with the drive shaft. For this purpose a traditional speedometer-transmitter is not suitable, as its sensitivity is low, so we used a frequency transmitter. With vehicles provided with a brake system with blocking prevention, there is another possibility for measuring number of revolutions, as these vehicles are always provided with r.p.m. signal transmitters arranged at every wheel. The average of the signals of said transmitters can be utilized with the same results as by using the aforementioned method. It goes without saying that in the electronic control unit 13 both constant gear ratios and gear ratios of the individual gears are to be considered. The r.p.m. transmitter 11 is connected to one of the inputs of the electronic control unit 13.

With knowledge of the individual steps of the process, the electronic control unit 13 can be realized in several versions. One of the possible versions is illustrated in FIG. 4. Electronic elements are referred to in accordance with the IC catalog published by the Technical Publisher, Hungary.

The control unit 13, illustrated in FIG. 4, consists of the IC1 microprocessor (catalog number Z80A), the IC2 and IC3 programmable input-output units (8255), the IC4 three-channel programmable counter and timing unit (8253), the IC5 RAM unit (4016), the IC6 ROM unit (2732), the IC7 time pulse generator (7434), the IC8 reset unit (74 LS 132) and the IC9 decoder unit (74 LS 138).

Address data and controlling connections of several units are identical, so the IC2 and IC3 programmable input-output unit, the IC4 three-channel programmable counter and timing unit, IC5 RAM unit, IC6 ROM unit, the IC9 decoder unit are interconnected by buses.

The IC8 reset unit is connected to the "reset points" of the IC1 microprocessor, the IC2 and IC3 programmable input-output units, and the three-channel programmable counter and timing unit. Simultaneously, the outputs of the IC9 decoder unit are connected to the chip-select inputs of the IC2 and IC3 programmable input-output units, the IC4 three-channel programmable counter and timing unit, the IC5 RAM unit and the IC6 ROM unit. The IC7 time signal generator, the IC1 microprocessor and the IC4 three-channel programmable counter and timing unit are also interconnected, namely through the time signal input of the IC4 unit.

The electronic control unit 13 is interconnected with the various component elements in the following way:

The signals arriving from the shift selector switch 9 are received by the inputs of the IC3 programmable input-output unit, while the signals of the motor r.p.m. transmitter 10 and of the output r.p.m. transmitter 11 are received by the inputs of the IC4 three-channel programmable counter and timing unit.

Command signals of the electronic control unit 13 appear on the outputs of the IC2 programmable input-output unit. Said outputs are connected to the electric inputs of the electromagnetic valves 12 through the power amplifier 19 and 23 (see FIGS. 7-13). Power amplifiers 19 and 23 do not form the parts of the electronic control unit 13; their installation is not at all problematic for those skilled in arts.

For the sake of order it should be mentioned that the circuit arrangement as illustrated in FIG. 4 does not show the specific functional units, to which we shall refer in the following descriptions of the different versions of the invention. The explanation for this is that by using electronic elements specialized according to the operations, the overall electronic control can be built up more easily. It is quite obvious that an operational unit with a large capacity (e.g., a microprocessor) in itself is able to perform all the operations and signal evaluations, which were performed by single units illustrated as separate elements in the schematics in order to facilitate understanding.

Figure 5:
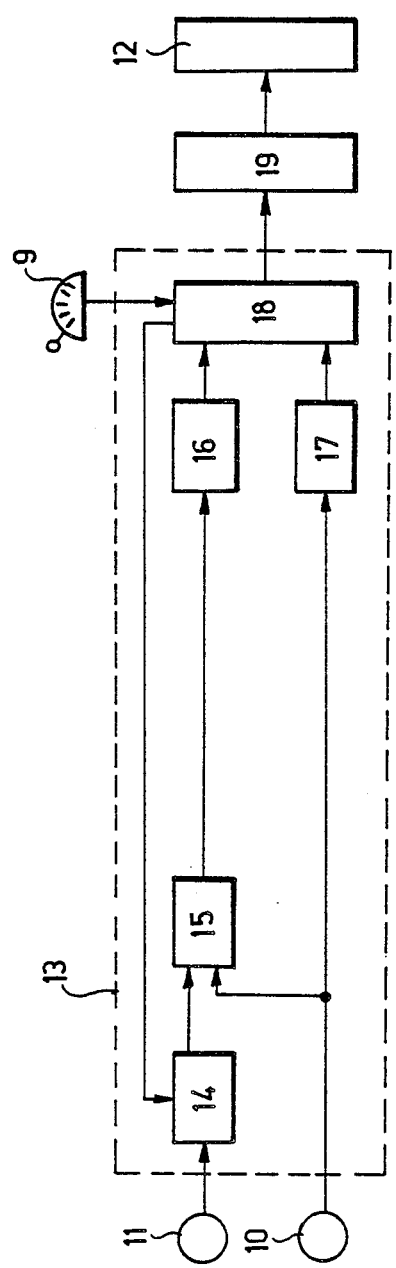
FIGS. 5 to 16 illustrate the block schematics for the performance of the different versions of the process according to the invention.

The process according to the invention can be understood in the easiest way on basis of the schematic according to FIG. 5. The electronic control unit 13 comprises a unit 14 for correcting the gears, a unit 15 forming the slip value, a slip evaluating unit 16, a unit 17 evaluating number of revolutions and the gear change control unit 18. In the course of describing the process, the interconnection of these elements will be detailed.

In a general case, gear change takes place, as follows:

If the driver intends to start the vehicle, he switches the shift selector switch 9, up to now in the neutral position "N", to the position "D". If all the conditions of safe start of the autobus are met one of the most important conditions is that the motor is running at idle speed, the driver actuates the throttle pedal (not illustrated here) and increases the r.p.m. of the motor. The gear change control unit 18 forwards a command signal for upshift through the power amplifier 19 to the electromagnetic valves 12 to shift to the low gear. As a consequence, the autobus starts out in low gear.

Henceforth the signal transmitter 11, arranged at the drive shaft of the transmission, delivers continuously the output r.p.m. signals to the electronic control unit 13, from where the signals arrive at the unit 14 correcting the gears.

The gear change control unit 18, independently of the command signal given for gear change, simultaneously transmits a signal to the unit 14, informing it about the gear currently engaged. The correcting unit 14 modifies the r.p.m. signal coming from the transmitter 11 in accordance with the gear ratio of the gear shifted. In such a manner an r.p.m. signal will be produced which reflects the prevailing input r.p.m. of the gear part of the transmission 2, or in other words of the output shaft of the hydrodynamic torque converter 4.

As soon as the driver starts the motor 1, the motor r.p.m. signal transmitter 10 delivers continuously the signal nmot for the electronic control unit 13. In the electronic control unit 13 the gear ratio existing between the crankshaft of the motor and the actually actuating component of the signal transmitter 10 can be considered by means of a simple substituting program. The signal nmot thus expresses the prevailing r.p.m. of the input shaft of the hydrodynamic torque converter 4.

That means that, in the electronic control unit 13, the r.p.m.'s of the input and output shafts of the hydrodynamic torque converter can be compared. The result of comparison gives the slip of the hydrodynamic torque converter 4. The output r.p.m. signal nseb and the motor r.p.m. signal nmot are fed into the unit 15 forming the slip value. Here the slip signal s is generated, expressing the prevailing slip of the hydrodynamic torque converter 4. The slip signal s is led into a slip evaluating unit 16. In the same manner, the motor r.p.m. signal nmot is led to the unit 17 for evaluating said signal. Evaluation of the signal nmot and the signal s can be well understood by the aid of FIG. 3.

Experimentally we have determined the slip value and motor r.p.m., at the simultaneous existence of which the motor 1 could move the bus in a gear higher by one stage, without reducing the velocity of the bus. Similarly, we have determined the slip value and motor r.p.m., at which, after having reached either of the two values, the motor is to be shifted back to a lower gear; otherwise the bus will be decelerated without any special cause and the motor gets throttled down.

From FIG. 3 can be seen that the transmission 2 is to be shifted to a higher gear if (i) the prevailing slip signal s falls below a predetermined upshift slip signal sf of about 12% and (ii) the prevailing motor r.p.m. signal nmot rises above a predetermined upshift signal nf of 1400 r.p.m.

Figure 3:
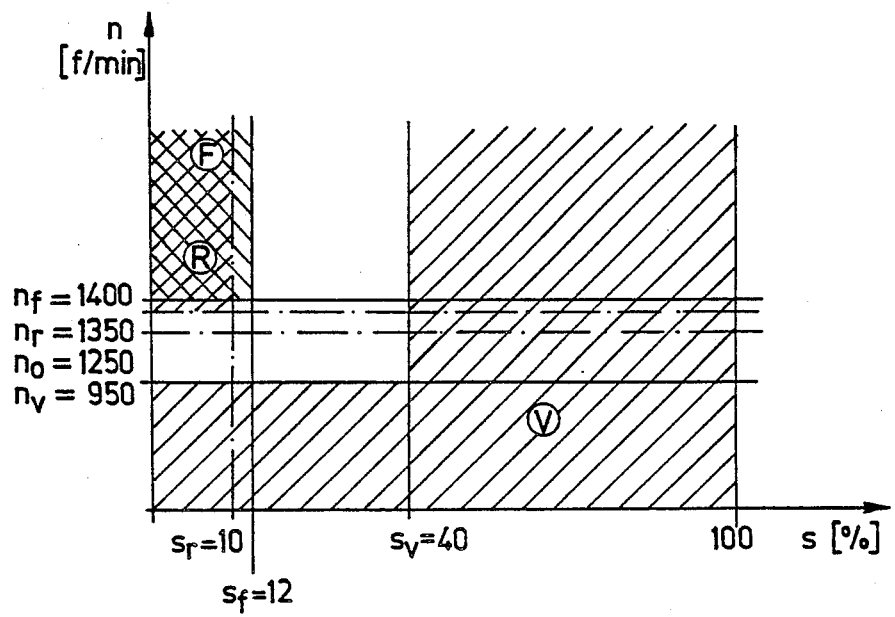
FIG. 3 is a graphic illustration of the gear changing conditions in relation to the number of revolutions and the slip.

From FIG. 3 it can also be seen, that changing to a higher gear may occur in the upshift area "F".

The transmission is to be shifted to a lower gear if (i) the prevailing slip signal s rises above a predetermined downshift slip signal sv of about 40% or (ii) the prevailing motor r.p.m. signal nmot falls below a predetermined downshift value nv of about 950 r.p.m.

These conditions determine the downshift area "V" in FIG. 3.

Accordingly, the task of the unit 16 is to examine the actual position of the slip signal s within slip signal range extending theoretically from 0% to 100%, and if the upshift slip signal sf is higher, a signal expressing the necessity of shifting up is generated. However, if the slip signal s rises above the downshift signal sv, a signal expressing the necessity of shifting down will be generated, which will be forwarded by the gear change control unit 18.

In the motor r.p.m. evaluating unit 17 the signal nmot is evaluated in a similar way. The unit examines the position of the prevailing r.p.m. signal nmot within the range of number of revolutions extending from 0 to 2200 r.p.m. If the actual signal nmot is above the signal nf, indicating the r.p.m. of upshift, a signal expressing the necessity of upshift is generated, whereas if it falls below the signal nv representing the r.p.m. of downshift, the unit 17 generates a signal expressing the necessity of down shifting and forwards said signal to the gear change control unit 18.

As soon as both the actual slip signal s and the actual signal nmot of r.p.m. of the motor are within the upshift area "F" of FIG. 3, the gear change control unit 18 receives from both the slip evaluating unit 16 and the r.p.m. evaluating unit 17 the signals expressing the necessity of upshift, so it gives an upshift command signal through the power amplifier 19 to the electromagnetic valves 12 of the transmission 2, e.g., for switching off the low gear I and to shift up to the second gear II.

The gear change control unit 18 gives the command signal for upshift in a similar way, when it becomes necessary to shift to the high speed (III) gear. This happens when the actual slip signal s and the actual r.p.m. signal nmot of the motor are again in the upshift range "F" of FIG. 3, in accordance with the intention of the driver directed to acceleration.

It is easy to see without needing explanation that the gear change control unit 18 is helped by an internal memory when choosing the proper gear, which stores the identifying signal of the prevailing gear. In such a manner the gear change control unit 18 is able to decide which gear should be shifted in addition to the evaluation of the necessity of changing up or changing back. As this decision does not form the object of our invention, a detailed specification seems to be superfluous.

For the sake or order it should be mentioned that the gear change unit 18 has to fulfil a further function. If in the course of travel the transmission 2 is shifted eventually to the neutral position, and thereafter, while travelling, we intend to shift to any of the gears, it is the task of the gear change contol unit 18 to decide which gear corresponds primarily to the actual velocity of the vehicle. As this decision does not form the object of our invention either, we do not deal with the matter.

As it is well known, the task of the hydrodynamic torque converter 4 is to establish conformity between loadability of the motor 1 and actual load of the vehicle, so it is not at all desirable to engage the friction clutch 3 at greater loads. At the same time it seems to be expedient to engage the friction clutch 3, if for some reason the requirements of shifting up into a higher gear are not met but one nevertheless can reckon with a continued advance of the vehicle with the gear shifted. From the previously described task of the hydrodynamic torque converter, if follows that the friction clutch 3 has to be released prior to the necessity for shifting down to a lower gear, as in this case the hydrodynamic torque converter 4 will slip and the number of rotation of the motor will not fall to an extent which would cause throttle down of the engine in a lower gear.

Conditions for engaging the friction clutch 3 can be determined from FIG. 3.

The friction clutch becomes engaged if
(i) the prevailing signal s drops below a predetermined level sr of about 10%, and
(ii) the prevailing motor r.p.m. signal nmot rises above a predetermined level nr of about 1350 r.p.m.

The friction clutch releases, if the prevailing motor r.p.m. signal nmot drops below a predetermined level no of about 1250 r.p.m.

An increase of the slip signal s does not effect the release of the friction clutch 3. The reason for this is that, when the friction clutch 3 is engaged, the input shaft and shafts of the hydrodynamic torque converter 4 are rotating with identical numbers of revolutions. Accordingly, slip does not occur.

The selection of the level of the motor r.p.m. signal no for release of the clutch, requires further explanation:

As it is well known, the ability of the hydrodynamic torque converter 4 to transmit torque varies with the r.p.m. of the motor 1. At a lower number of revolutions, the torque transferring ability of the hydrodynamic torque converter is less; at a higher r.p.m., it is higher than the torque to be measured on the crankshaft of the motor 1. Approximately 1250 r.p.m. is the level at which the hydrodynamic torque converter will slip, so release of the friction clutch 3 is imperative at this level. In order to be able to fulfil this task, the electronic control unit 13 (shown in FIG. 7) is provided with an additional slip evaluating unit 20, an addition unit 21 for evaluating engine r.p.m., and with a clutch control unit 22.

For controlling the engaging and releasing of the friction clutch 3, the slip signal s of the slip measuring unit 15 is led to the additional slip evaluating unit 20 and the motor r.p.m. signal nmot of the signal transmitter 10 is led to the additional r.p.m. evaluating unit 21. Therein the signals are compared to the predetermined slip signal sr, the predetermined r.p.m. signal nr and the predetermined r.p.m. signal no. If the actual slip signal s is lower than the signal level sr and the actual r.p.m. signal nmot signal of the motor rises above the signal level nr, the slip evaluating unit 20 and the r.p.m. evaluating unit 21 forward a signal to the control unit 22, which forwards through the power amplifier 23 a command signal to the electromagnetic valve 12 which actuates the friction clutch 3. Now, the friction clutch 3 becomes engaged. That means that a mechanical connection is established between the crankshaft of the motor 1 and the input shaft of the gear part of the transmission 2.

As indicated in FIG. 3, the slip signal level sr is stricter (lower), than the upshift slip signal level sf, while the r.p.m. signal nr is more lenient (lower), than the upshift signal level nf. In such a manner the following can be achieved:

As soon as the driver speeds up the vehicle, the motor r.p.m. signal nmot increases more intensely than slip signal s decreases. In such a manner, first of all the signal nmot will reach the upshift signal nf. Thereafter, the slip signal s drops below the upshift level sf. Although, the r.p.m. signal nmot surpassed the clutch engaging signal level nr, the slip signal s could not yet reach the level sr. As a consequence, the gear change control unit 18 generates the command signal for upshift without causing the clutch to be engaged.

If the driver does not intend to speed up, or rather he lets off somewhat on the gas, the r.p.m. signal nmot does not increase above the upshift signal level nf. At the same time value of the slip signal s will be less. If the slip signal s drops below the level sr, that means that load has decreased to a favorable extent, at which operation of the hydrodynamic torque converter 4 becomes superfluous in spite of the relatively low r.p.m. of the motor. Under said circumstances a more favorable operation of the vehicle can be obtained, if the friction clutch 3 is engaged; accordingly the clutch control unit 22 will give the command signal for clutch engagement.

As it is well known, down shifting of the transmission 2 may result from one of three reasons: namely, the driver decelerated the vehicle, or speeds up considerably (overtaking) or the bus is ascending a hill.

The most simple case is when the driver is slowing down. In this case the throttle pedal is allowed to return in its basic position. As a consequence, the r.p.mn. of the motor 1 decreases. As soon as the signal nmot drops below the signal no, the r.p.m. evaluating unit 21 gives a signal to the clutch control unit 22 for release of the friction clutch 3, and a command for such release is forwarded through the power amplifier 23 to the electromagnetic valve 12 which actuates the friction clutch 3. The friction clutch 3 releases, and thereafter torque is transferred through the hydrodynamic torque converter 4.

As soon as the r.p.m. signal nmot drops further and lies below the downshift level nv, the r.p.m. evaluating unit 17 generates a signal for downshifting. As a consequence, the gear change control unit 18 gives a downshift command signal through the power amplifier 19 to the electromagnetic valves 12 for downshifting from the high speed gear III to the second gear II.

If the driver further decelerates the vehicle, the subsequent dropping of the signal nmot below the level nv causes the gear change control unit 18 to give the command signal for further downshift to the basic gear I.

We are confronted with a quite different situation in course of ascent and acceleration. In this case an uncertain shifting situation may arise, which has been eliminated up to now by the defined adjustment of conditions of upshift in one or two stages. In course of the process according to the invention by examining the state of loading immediately prior to downshifting to a lower gear we can adjust the conditions for upshifting correspondingly. Adjustment is performed only to the extent necessary.

For realizing the process, first of all the mode and extent of adjustment are to be determined. For this purpose it was stated experimentally that the upshift slip signal sf is to be adjusted to a minimum level of 2%. That means that the corrected upshift slip signal sfk must lie between 12% and 2%.

The extent of adjustment is to be determined as a function of the load prior to downshifting. For this reason we have to examine the magnitude of r.p.m. of the motor 1 in the moment of downshifting, i.e., the position of number of revolutions within the range of economical r.p.m. With the described motor this economical range of operation lies between 1250 and 1600 r.p.m. In the first approach we suppose a linear relation between the position within said range of operational r.p.m., and the extent of adjustment of the conditions of upshifting. In the course of our experiments, modification did not become necessary. However, it seemed to be expedient to determine the correct relation experimentally.

Figure 9:
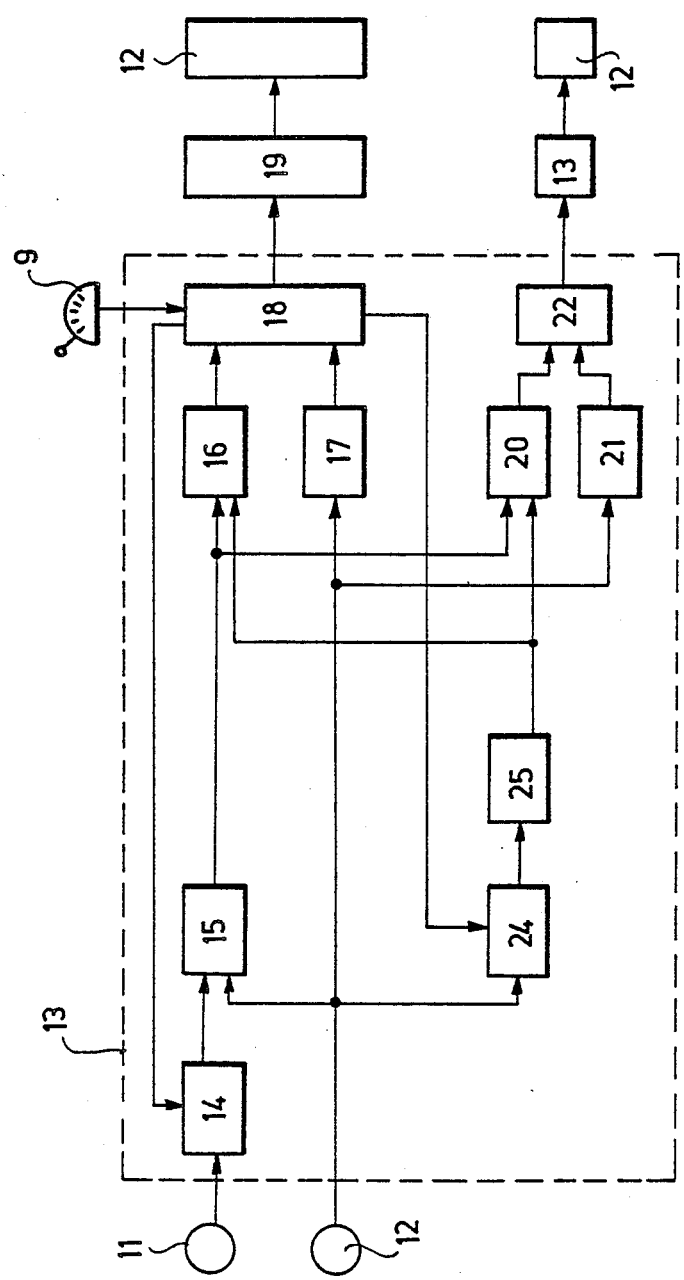

In case of a linear relation, correction is realized by the following formula:

$$k = \frac{n_{umax} - n_{back}}{n_{umax} - n_{umin}}$$

wherein:
k=correction factor
$n_{back}$=r.p.m. prior to downshift
$nü_{min}$ =lowest r.p.m. of economical operation (1250 r.p.m.)
$nü_{max}$ =highest r.p.m. of economical operation (1600 r.p.m.)
Accordingly $$sk = k \times (sf - sfmin)$$

wherein:
sk=correction value
k=the correction factor, as previously mentioned
sf=normal slip signal value for upshift (12%)
sfmin=the most adjusted slip signal for upshift (2%)
Finally:

$$sfk = sf - sk$$

$$srk = sr - sk$$

wherein:
sfk=the corrected upshift slip signal
srk=the corrected slip signal for clutch engagement
By reference to FIG. 9 and in view of the aforementioned, the process can be easily understood.

In the FIG. 9 illustration, the signal nmot is continuously fed into the memory 24. When the driver begins to overtake by pressing down energetically on the throttle pedal, he increases the r.p.m. of the motor 1. As a consequence the signal nmot also increases. As the input shaft of the gear part of the transmission 2 is unable to immediately follow the crankshaft of the motor 1, the signal nseb characterizing the output r.p.m. will increase at a slower rate. Consequently, the slip signal s increases and as soon as it reaches the slip signal level sv for downshift, the gear change control unit 18 gives a command signal for downshift to the next lower gear. Simultaneously the gear change control unit 18 forwards a command signal to the memory 24 to store the most recent motor r.p.m. signal nmot.

The signal nmot is forwarded to the unit 25 wherein, in accordance with the previously presented formula, the correction value sk is generated, which is then led to the slip evaluating unit 16 and to the additional slip evaluating unit 20. The slip evaluating unit 16 compares the slip signal s, coming from the unit 15, with the upshift slip signal sfk having been modified previously with the correction value sk and if the adjusted conditions are met, the necessity of upshift to a higher gear will be signalled to the gear change control unit 18.

Similarly, the slip evaluating unit 20 signals the necessity of engagement of the friction clutch 3 to the clutch control unit 22, if the slip signal s is lower than the slip signal srk having been modified with the correction value sk.

After having finished acceleration or overtaking, the output r.p.m. signal nseb catches up with the motor r.p.m. signal nmot. The slip signal decreases accordingly and as soon as it drops below the corrected slip signal sfk for upshifting, the slip evaluating unit 16 gives a signal to the gear change control unit 18 for upshift to a higher gear. Upon this signal the gear change control unit 18 gives a command signal for upshift to the electromagnetic valves 12. Simultaneously, it gives a command signal for extinguishing the correction value sk. In such a manner all the basic conditions for changing the gears and short circuiting of the friction clutch 3 are restored.

Essentially the same procedure is followed, when the autobus is in ascending travel. In this case the slip signal s does not change by intense throttling, but by the reduction of the number of revolutions of the input shaft of the gear part of the transmission 2 and reduction of the output r.p.m. signal nseb, both resulting from the increased load.

As soon as the slip signal s reaches the change back slip signal sv, the slip evaluating unit 16 generates the signal indicating the necessity of downshift. Simultaneously the gear change unit 18 gives a command signal to the electromagnetic valves 12 for downshift to a lower gear. At the same time, upon the command signal of the gear change control unit 18 the process of generating the corrected upshift slip signal sfk begins in a previously described way.

When we intend to adjust the conditions of upshift in course of overtaking or ascending travel, we start from the fact that by applying more strict conditions, safer situations of gear changing are realized, i.e. uncertain situations should be eliminated. Accordingly, the value of the most severely corrected upshift slip signal sfk was fixed at 2%. However, it may happen, that this selection does not prove very fortunate, because possibly the too strict and severe requirement cannot be met. This can be eliminated in two ways. If the driver is of the opinion that the number of revolutions of the motor 1 is too high, yet shifting to a higher gear does not occur, by letting up on the gas he may establish a push operation, in the course of which the slip signal s will surely drop below 2%. By repeated throttling, conditions of upshift can be achieved.

With the other possibility, intervention is not left to the driver. The apparatus is provided with an auxiliary program in which, if the number of revolutions of the motor 1 surpasses 2050 r.p.m., adjustment of changing up conditions will be automatically annulled. In this connection it should be mentioned that the memory 24 is always registering the momentary motor r.p.m. signal nmot upon the command signal of the gear change control unit 18 commanding downshift. In the course of normal traffic conditions the magnitude of the motor r.p.m. signal nmot does not require the correction of the upshift slip signal sf. Accordingly, the unit 25 does not generate the correction value sk.

Figure 6:
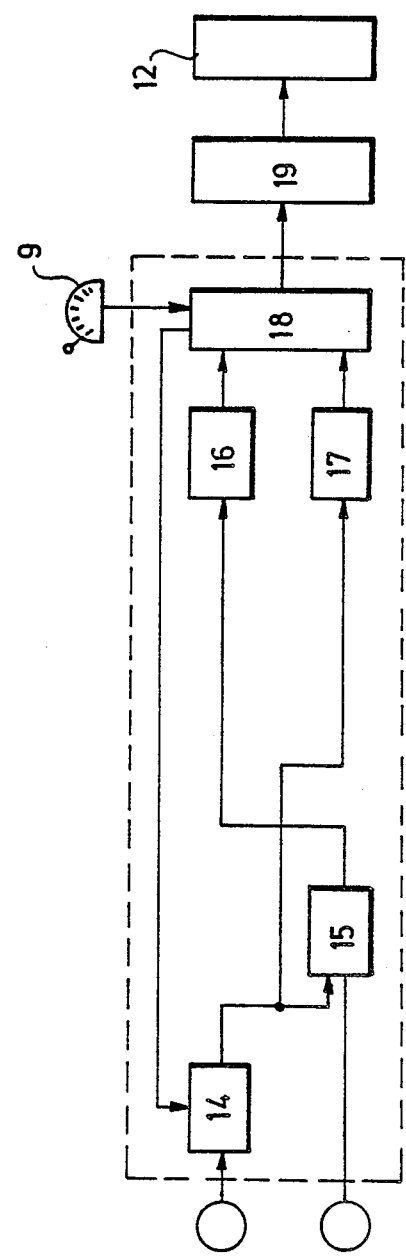
Figure 7:
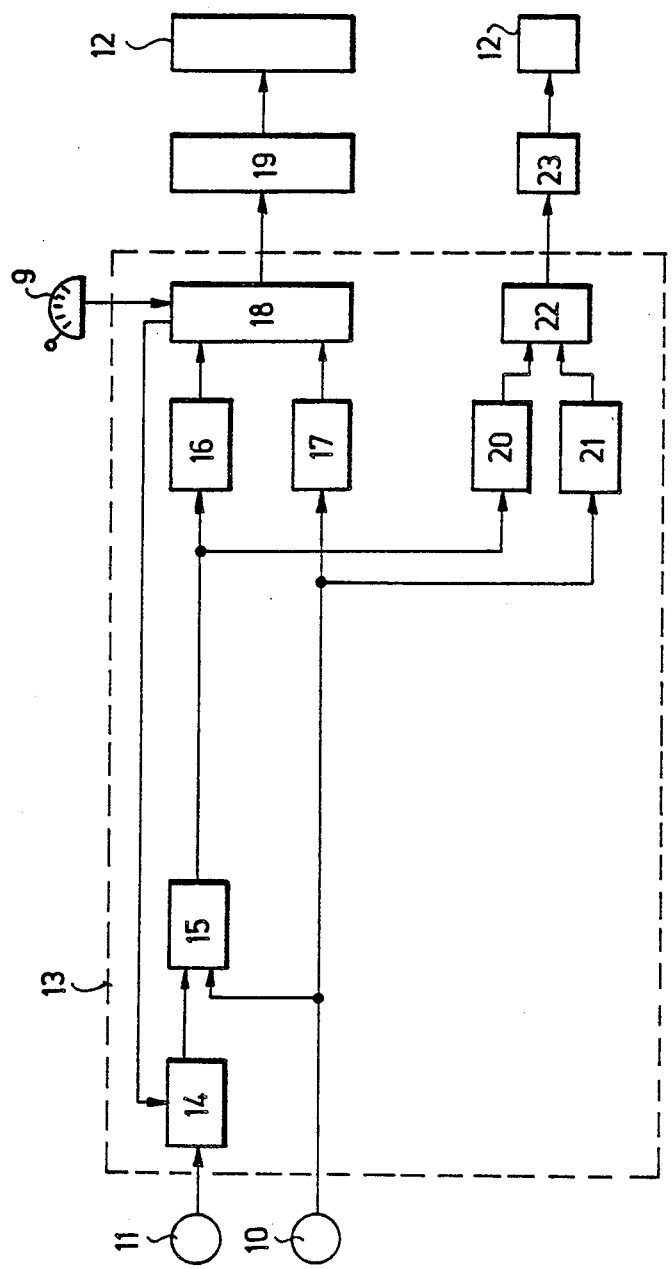

With some most simple changes the process as described can be realized in another version, with the same result. In course of the process as above described, one of the conditions of gear shifting was a change in the motor r.p.m. signal nmot. This is not always necessary. Examination of the output r.p.m. signal nseb can suffice for this purpose. The procedure according to FIG. 6 illustrates the basic step of a process, in course of which the output r.p.m. signal nseb of the unit 14, corrected for the selected gear by signal from the unit 18, is fed into the r.p.m. evaluating unit 17, where the signal is compared with the upshift signal nf and the downshift signal nv. It goes without saying that these do not correspond numerically to the values for the motor r.p.m. signal nmot. It is recommended to determine these values experimentally, as influence of the hydrodynamic torque converter 4 can be considered theoretically only with difficulty. At the same time, it is still considered as more advantageous, as the influences of load on the motor 1 and on the hydrodynamic torque converter are considered jointly.

Figure 8:
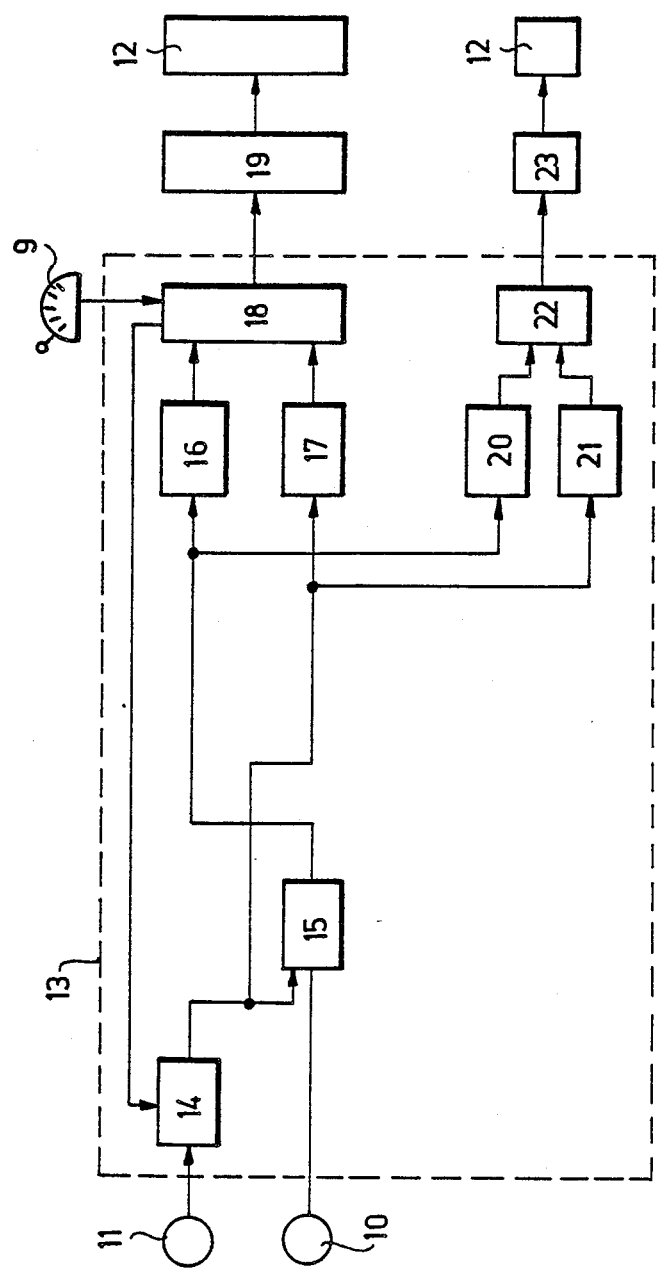

Analogously, one of the conditions of engaging the friction clutch 3 may lie in the change of the output r.p.m. signal nseb, as illustrated in FIG. 8. In this case a gear-corrected output signal nseb is generated in the unit 14 which is compared with the signal nr and the signal no. As will be understood, these do not correspond with the values determined for the use with the motor r.p.m. signal nmot. It is recommended to determine these values experimentally.

Adjustment of conditions of upshifting the gears can be realized also by changing the level of the upshift signal nf. This can be performed in the following way:

The correction factor k is the same, as previously, so $$nk = k \times (nfmax - nf)$$

wherein:
nk = correction value
nfmax = the most adjusted r.p.m. signal for upshift (1600 r.p.m.)
nf = r.p.m. signal for normal upshift (1400 r.p.m.)
at last $$nfk = nf + nk$$

and $$nrk = nr + nk$$

wherein:
nfk = corrected r.p.m. signal for upshift
nrk = corrected r.p.m. signal for clutch engagement.

Figure 10:
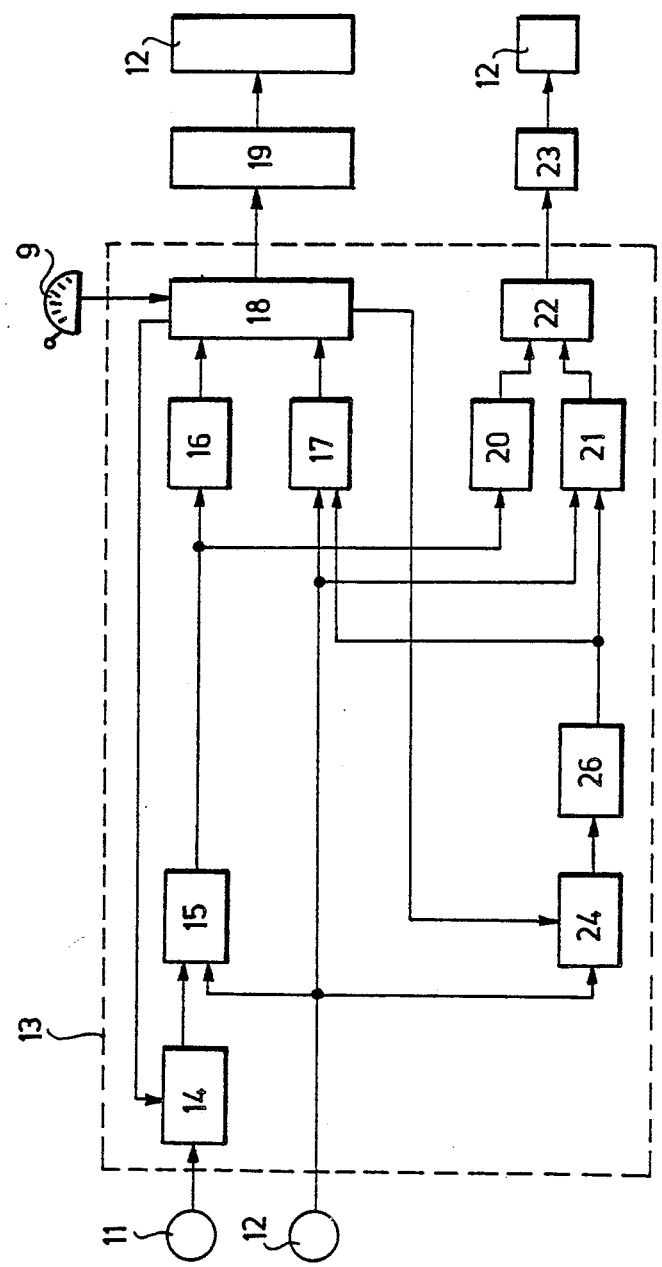

This version of the process can be well understood on the basis of the illustration of FIG. 10. Upon the command signal of the gear change control unit 18 the memory unit 24 stores the current motor r.p.m. signal nmot, which is forwarded to the unit 26 generating the comparative r.p.m. signal. By using the above mentioned formula we determine the correction value nk, and said correction value nk is led to the r.p.m. evaluating units 17 and 21, wherein the signals nfk and nrk are generated. Henceforth these signals will be compared in the evaluating units 17 and 21 with the actual motor r.p.m. signal nmot. The remaining parts take place quite analogously with the previously described proceedings. Accordingly, detailed specification is considered as superfluous.

Diverse simplified versions of the process according to the invention can be also realized. To a certain extent these are similar to the processes described as prior art. However, similarity lies all in all in the fact that also in this case conditions of upshift were brought in compliance with simple concrete situations of traffic. However the answer following from the uniformity of the basic process is still new.

Figure 11:
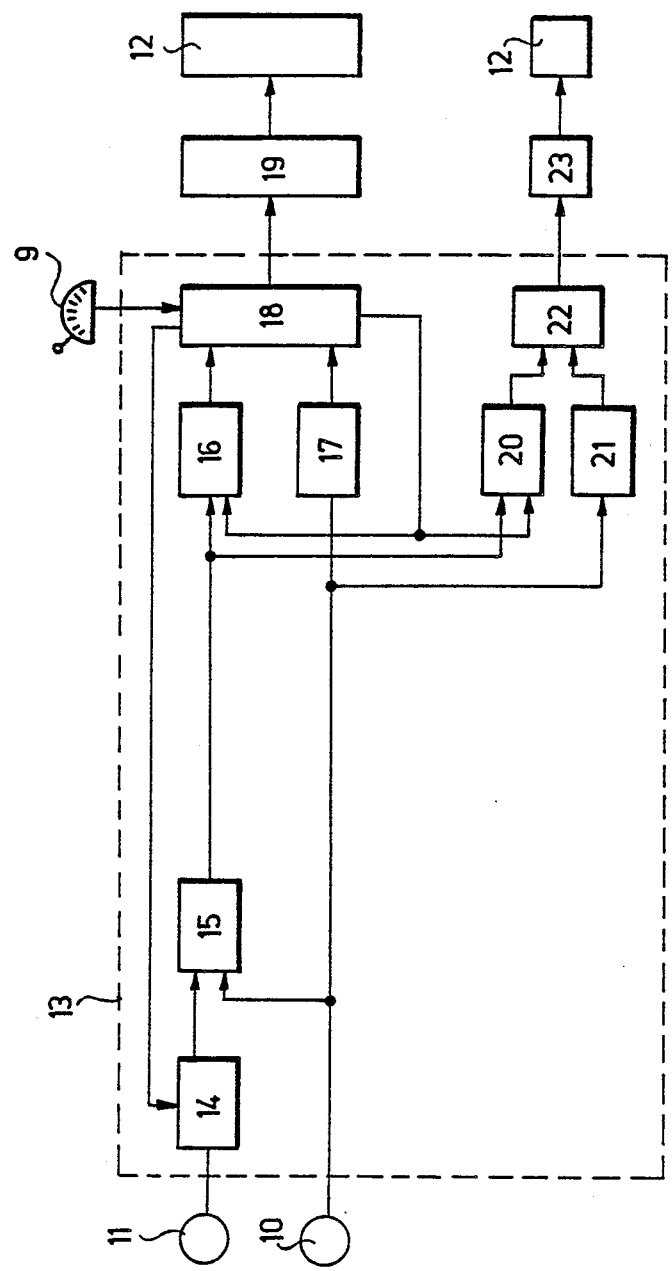

The most simple version is illustrated in FIG. 11. In this case gears are shifted under normal conditions in the same way, as with the aforementioned version. That means that the gear correction unit 14 produces continuously the output signal nseb from which the signal nmot is generated. Using this, the slip signal s is generated in the slip evaluating unit 15. The slip signal s is tested in the slip evaluating unit 16, the r.p.m. signal nmot in the r.p.m. evaluating unit 17. From the point of view of gear change conditions the signals are examined and the gear change control unit 18 is informed on the necessity (or not) of upshift or downshift. If necessary the gear change control unit 18 gives the command for upshift or downshift through the power amplifier 19 to the electromagnetic valves 12.

The slip evaluating unit 20 and the r.p.m. evaluating unit 21 examine in a similar way the conditions of engaging the friction clutch 3 and inform the clutch control unit 22 on the necessity of engagement or release, which forwards then the necessary command signal through the power amplifier 23 to the electromagnetic valve 12 which actuates the friction clutch 3.

In comparison to the earlier specified version, simplification lies in the adjustment of the conditions of upshift and clutch engagement.

In addition to the normal upshift slip signal sf an adjusted slip signal sfs reduced according to a predetermined slip value, is fed into the slip evaluating unit 15. In the same way, in addition to the normal clutch engagement signal sr, an adjusted slip signal srs, reduced according to the aforementioned slip value, is also stored. The slip value reduction amounts to 9%. Accordingly, the adjusted upshift slip signal sfs equals a 3% slip value, while the adjusted clutch engaging slip signal srs corresponds to a 1% slip value.

The gear change control unit 18 gives the command for the application of the adjusted conditions in the following way:

When the gear change control unit 18 emits a command signal for downshift, it also instructs the slip evaluating unit 16 to reduce the normal upshift slip signal sf and to compare the actual slip signal s with the adjusted upshift slip signal sfs. In this case the downshift command signal of the gear change control unit 18 instructs the slip evaluating unit 20, too, that furtheron instead of the normal clutch engaging slip signal sr, a reduced or adjusted slip signal srs should be compared with the actual slip signal s.

After the fulfillment of the first adjusted upshift conditions the adjustment is extinguished by the command signal by which the upshift is effected.

This simplified version lacks a high degree of sensitivity. Additionally it has a further disadvantage, not too significant, in that after each single downshift conditions of upshift will be adjusted. In such a manner even after a downshift in course of "normal" deceleration more severe conditions are to be fulfilled in respect to the next upshift.

Determination of the extent of adjustment requires some explanation. It can be well seen that the adjusted upshift slip signal sfs was chosen higher than the most sever upshift slip signal sfmin in the basic version. As already told before, this latter requirement can be met with considerable difficulty only. Accordingly the vehicle is to be helped over the difficulty either by the proper maneuver of the driver or with an adequate program.

At the same time, in the course of our experiences we found that at the autobus, when travelling up a slope with high ascent, a situation may occur, in which adjustment is indispensable up to the adjusted upshift slip signal sfs.

Figure 12:
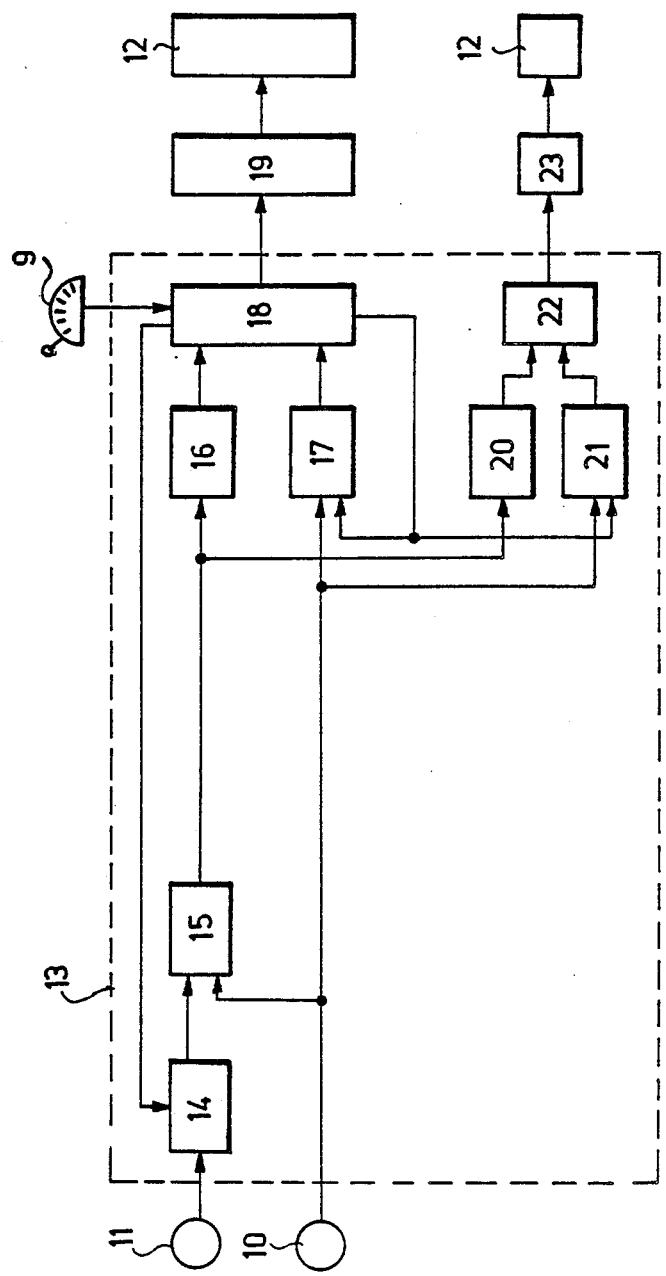

From the illustration of FIG. 12 it can be seen that a most simple version of the process can be realized, if out of the conditions of gear change not the upshift slip signal sf but rather the upshift r.p.m. signal nf is adjusted.

To achieve this, in addition to the upshift signal nf an adjusted r.p.m. signal nfs for upshift is also fed into the r.p.m. evaluating unit 17.

In the same way the r.p.m. evaluating unit 21 has also a clutch engaging r.p.m. signal nrs increased by a predetermined value. In this case value of increase was chosen 200 r.p.m. That means practically that the adjusted upshift r.p.m. nfs, corresponds to the most adjusted r.p.m. upshift signal nfmax, as determined in the basic version. This can be realized without problems, as the range of operative r.p.m. of the motor extends to 1800 r.p.m. Using the aforementioned value of increase, the adjusted clutch engaging r.p.m. signal nrs will be equal to 1550 r.p.m.

Application of adjusted conditions takes place upon the command signal of the gear change control unit 18.

Figure 14:
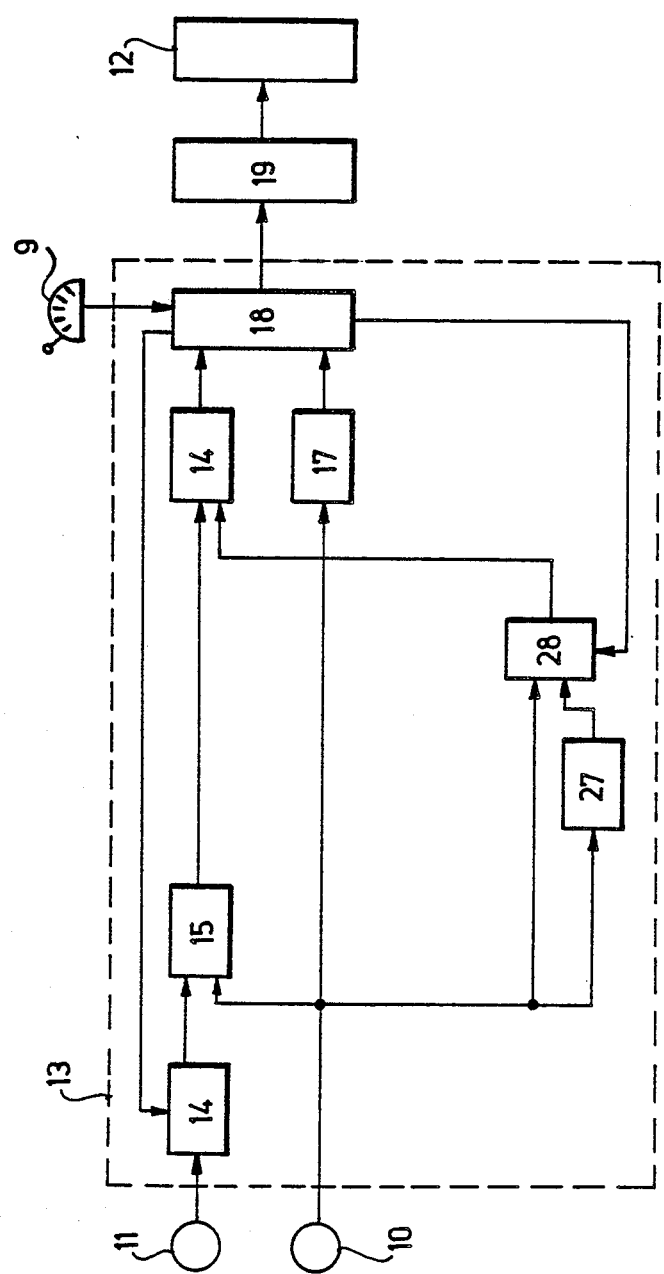

FIG. 14 illustrates a simplified version of the process, however, somewhat more complicated than the one previously described. The solution of tasks in connection with normal traffic condition is as usual. That means that the gear correction unit 14 generates the output r.p.m. signal nseb and from this signal and the r.p.m. signal nmot of the motor a slip signal s is generated in the slip value forming unit 15.

Slip evaluating unit 16 examines the slip signal s, while the unit 17 examines the signal nmot. In a given case it signals the necessity of upshift or downshift to the gear change control unit 18, which forwards the command signal through the power amplifier 19 to the electromagnetic valves 12.

As conditions of engaging and releasing of the friction clutch 3 follow the conditions of gear changes in the same way as in the basic version, for the sake of better comprehension in the following we do not deal with the modification of the conditions of engaging or releasing the friction clutch 3.

However, prior to surveying the modification of the conditions of gear change, let us consider for which causes downshift to a lower gear occurs and which are the changes causing it.

As already mentioned before, downshift may occur in three situations, namely in the course of normal deceleration, overtaking and ascending.

In the course of normal deceleration, the motor r.p.m. signal nmot and output r.p.m. signal nseb are changing. However, as the latter one is slowing down with delay, the slip signal s will be also reduced. Accordingly, downshifting will occur as the motor r.p.m. signal nmot falls below the signal level nv. Now, if we analyze the change of characteristics, we may arrive at the conclusion that if, from the change of the output r.p.m. signal nseb a signal vns proportional to the change in output r.p.m. of velocity is formed. Reduction of the r.p.m. is considered as a negative change and, in course of normal deceleration, the signal vns will be negative.

Similarly, from the change of the motor r.p.m. signal nmot we may form the signal vnm proportional to the change in r.p.m. of the motor, which will be negative, too. Now, if from the change of the slip signal s a signal vs is formed, proportional to the change in slip, in accordance to the earlier interpretation this signal will be also negative.

In course of overtaking, both the motor r.p.m. signal nmot and output r.p.m. signal nseb increase. However, as the latter one increases in a slower rate, the slip signal s also increases. Consequently, downshift will take place at a higher nmot signal, as the slip signal s is increased.

Accordingly, based on the analysis of the characteristics, it can be stated that both the signal vnm (change in r.p.m. of the motor) and the signal vns (change in r.p.m. of) velocity will be positive, so the signal vs (change in slip) will be positive, too.

Finally, in the course of ascending both signals, namely nmot and nseb decrease. However, the latter one to a greater extent. Consequently, the slip signal s increases. So downshifting takes place at a relatively high r.p.m. of the motor. Now analysis of the characteristics indicates that both signals, namely vns (change in r.p.m. of velocity) and vnm (change in r.p.m. of the motor) will be negative, while the signal vs (change in slip) will be positive.

The state of characteristics immediately prior to changing back is contained in the following table:

| Characteristics | Normal Deceleration | Changes overtaking | Travel Uphill |
| --- | --- | --- | --- |
| nmot | below nv | above nv | above nv |
| vnm | − | + | − |
| nseb | decreases | increases | decreases |
| vns | − | + | − |
| s | decreases | increases | increases |
| vs | − | + | + |

From the table it becomes obvious that there are certain characteristics which, when analyzed in pairs, give the unambiguous explanation for the necessity of downshift. Now, if we contend ourselves with the fact that conditions of upshift will not be determined continuously but, similarly to earlier solutions, conditions will be determined by some discrete value, by analyzing the pair of characteristics chosen from the table, even without any further information (such as measuring the angle of inclination, measuring acceleration etc.) proper conditions can be indicated.

According to the illustration of FIG. 14 the process may be realized in the following way:

The motor r.p.mn. signal nmot is led to the unit 27 forming the signal vnm of change of r.p.m. of the motor. This signal and the motor r.p.m. signal nmot are led into the unit 28 forming the comparative slip signal. In the unit 28 upon the command signal for downshift from the gear change control unit 18 it will be examined whether in the moment of issuing the command the motor r.p.m. signal nmot was below or above the downshift signal nv, as well as whether the sign of the signal vnm is positive or negative.

Now, if the signal nmot is below the downshift signal level nv and the signal vnm is negative, a "normal" slip upshift signal sfn is selected by the unit 28 and led to the slip evaluating unit 16. In the unit 16 the actual slip signal s will be compared to the "normal" upshift slip signal sfn.

If the motor r.p.m. signal nmot exceeds the downshift signal level nv and the signal vnm (change in the r.p.m. of the motor) is positive, a more adjusted slip signal sfe for "overtaking" is selected by the unit 28, and said signal is led to the unit 16 for evaluating the slip. Furtheron, slip signal s will be compared with the adjusted signal sfe.

If the motor r.p.m. signla nmot is higher than the downshift signal nv and simultaneously the change signal vnm is negative, a still more adjusted slip signal sfh for "ascending travel" is selected by the unit 28, which is led to the slip evaluating unit 16, where it is compared with the actual slip signal s.

Experimentally the value of upshift slip signals was determined, as follows:

sfn="normal" upshift slip signal=12%
sfe=upshift slip signal for "overtaking"=10%
sfh=upshift slip signal for "ascending travel"=3%

When determining the signal sfh, we started from the same consideration, as when choosing the adjusted slip signal sfs with the earlier described version of the process.

Figure 15:
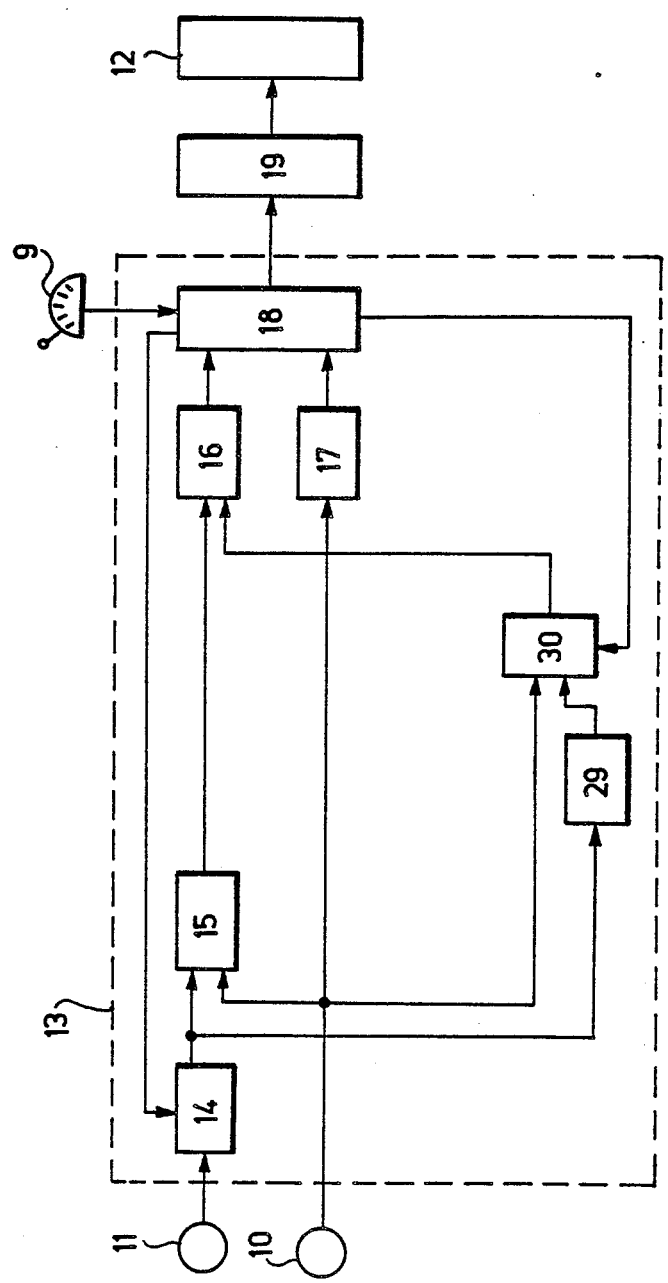

This version of the process can be realized according to the illustration of FIG. 15, such that from the output r.p.m. signal nseb the change signal vns is generated in the unit 29. This is fed together with the motor r.p.m. signal nmot into the unit 30 forming the comparative slip signal. Evaluation of these two characteristics takes place identically with the earlier specified realization. Selection and forwarding to the slip evaluating unit 16 of the signals sfn, sfe and sfh are in compliance with the earlier described methods, so this version of the process does not require a detailed specification.

Figure 16:
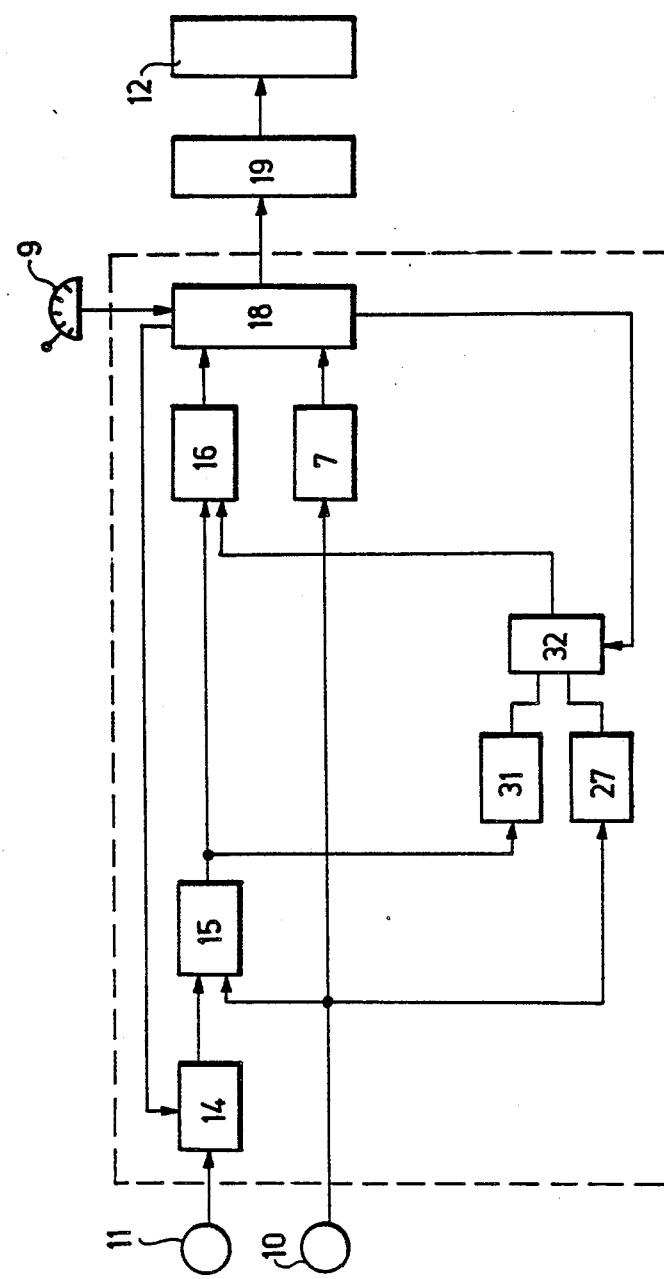

Essentially, the principle of the version according to FIG. 16 is identical with the aforementioned. With this version, the change signal vnm is formed from the r.p.m. signal nmot. From the slip signal s the change signal vs is generated in the unit 31. Signals vnm and vs are led into the unit 32 forming the comparative slip signal and we analyze their condition in the second of downshifting. The command signal of the gear change control unit 18 serves for this purpose.

If both change signals vnm and vs are negative, a "normal" upshift slip signal is chosen by the unit 32, which is led to the unit 16.

When both signals vnm and vs are positive, a more adjusted signal sfe for "overtaking" is chosen by the unit 32 and this is also led into the slip evaluating unit 16.

If the change signal vnm is negative, and the change signal vs is positive, an even more adjusted slip signal sfh for "ascending travel" is chosen by the unit 32 and led to the slip evaluating unit 16.

The values of the signals sfn, sfe and sfh may be identical with those previously described. Utilization in the slip evaluating unit 16 may be identical, too.

The versions of the process based on the changes in the operative state of the motor vehicle may be further simplified if no difference is made between "normal" deceleration and "overtaking". In the course of overtaking the actual slip signal s overtakes the slip signal sf of changing up more slowly on the whole. Accordingly, requirements in respect to upshifting are met with delay. Now, if in the second of changing back we examine one of the r.p.m. change signals vnm and vns and a negative value is obtained, and if we examine the motor r.p.m. signal nmot and it exceeds the downshift signal level nv, or when examining the value of the slip change signal vs we obtain a positive value, a signal sfh for "ascending travel" is chosen, which may have the same value, as previously described.

If the analysis of the characteristics shows a different result in the moment of changing back, we select the "normal" upshift slip signal sfn.

The slip signal s is evaluated in the unit 16 in the same way as with the earlier versions of the process. Accordingly, further detailed description is not required.

As mentioned in connection with FIGS. 6 and 8, conditions for upshift can be modified not only by adjusting the upshift slip signal sf and the clutch engaging slip signal sr, but also by adjusting the upshift signal level nf and the signal nr for clutch engagement. This is valid also for the versions based on the change in the operative state of the motor vehicle. Signals nfn, nfe and nfh ("normal", "overtaking", ascending travel") are to be determined experimentally.

Figure 13:
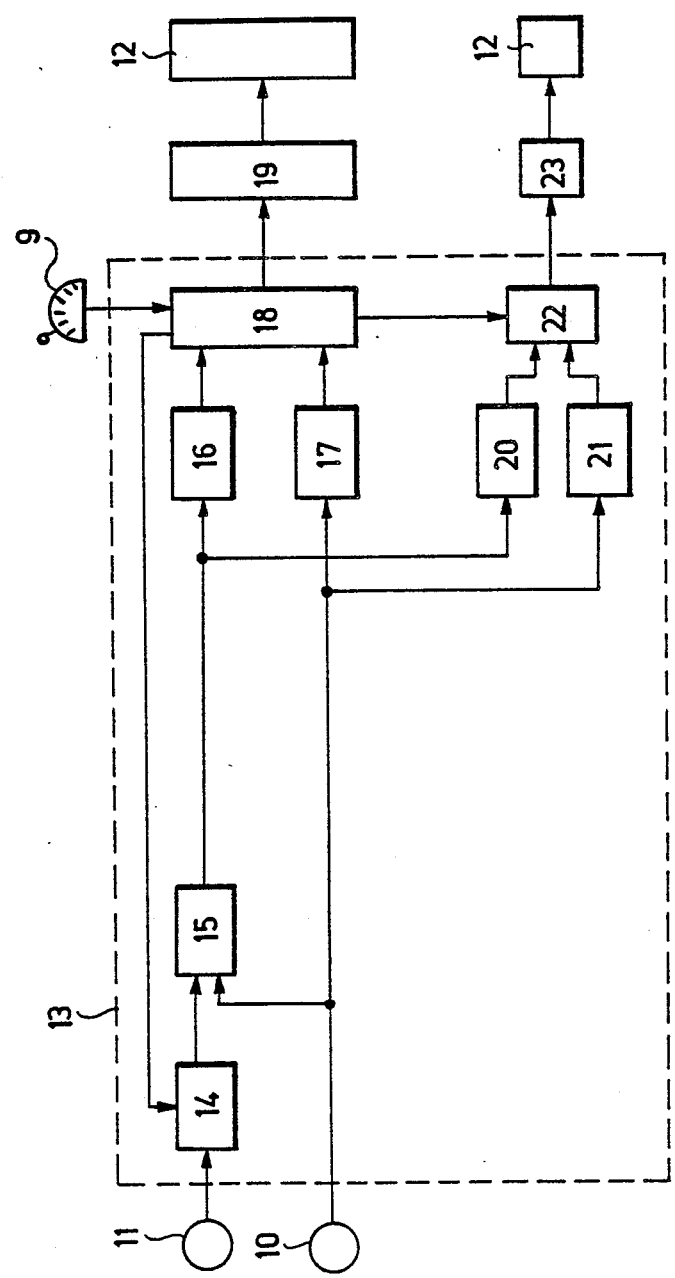

Another mode of simplification, which can be applied with any version of the processes specified can be understood by reference to FIG. 13. This version is valid exclusively for the friction clutch 3.

As mentioned before in connection with the basic version, there is an association between actuating the friction clutch 3 and shifting to a higher gear.

In the basic version we provided, with different conditions of upshift and clutch engagement, that if upshift requirements are met earlier, upshift occurs without engagement of the friction clutch 3. This can also be achieved in the following way:

Identical values were selected for the upshift slip signal sf and for the clutch engagement slip signal sr. With the command for upshift from the gear change control unit 18 we also give an inhibiting signal to the clutch engagement unit 22. Accordingly, if the requirements of upshift are met, the control unit 22 cannot give the command signal for engaging the clutch.

With the previously described versions of the process, numerical data have been given to correspond to the motor serving here as an example and to match with a three gear automatic transmission. With different motors and in particular with different types of the transmission, particularly if the number of gears is different, conditions of shifting may be considerably different, accordingly it seems to be expedient to determine these experimentally.

Finally, we should like to mention, that although we specified our process as using a shift selector switch, by which the driver may inhibit shifting to the gears II and III, as a matter of fact, the process according to our invention does not necessitate the switch. Modification of the conditions of upshift excludes the possibility of the occurrence of uncertain situations which could be eliminated only by external intervention (position I and II of the selector switch). Accordingly shifting switches were omitted in the final equipment.

We claim:

1. The process of controlling an automatic transmission for a motor vehicle, wherein the transmission includes a hydrodynamic torque converter and a shiftable mechanism providing a plurality of input-output gear ratios, and a clutch for by-passing said torque converter, which comprises
    (a) sensing the output speed of the transmission and generating an output speed signal corresponding thereto,
    (b) sensing the drive input speed of the transmission and generating an input speed signal corresponding thereto,
    (c) comparing said input speed signal and said output speed signal, in relation to the gear ratio of said transmission, and generating therefrom a slip signal representing the slippage within said transmission under momentary load,
    (d) comparing said slip signal with predetermined upper and lower slip limit values,
    (e) comparing at least one of the output speed signal and the input speed signal with predetermined upper and lower speed limit values,
    (f) executing a downshift from a higher gear ratio when said slip exceeds the predetermined upper slip limit value and/or when the compared speed signal is below the lower speed limit value,
    (g) executing an upshift from a lower gear ratio when said upper speed limit value is exceeded by the compared speed signal simultaneously with said slip being below said lower slip limit value,
    (h) at least one of said input speed or output speed signals being selected to be compared to predetermined upper and lower clutch control speed signals, and said slip signal being compared to a clutch control slip signal, said upper clutch control speed signal representing a speed below the upper speed limit value,
    (i) engaging said clutch to by-pass said torque converter when the speed indicated by the selected speed signal exceeds the speed represented by said upper clutch control speed signal and said slip signal indicates less slip than represented by said clutch control slip signal, and
    (j) disengaging said clutch in response to said selected speed signal indicating less speed than the speed represented by said lower clutch control speed signal.

2. The method of claim 1, further characterized by
    (a) upon downshifting of said transmission from a higher gear, storing in said memory the input speed signal at the time of said downshifting,
    (b) effecting compensating adjustments of said lower slip limit value and/or said clutch control slip signal as a function in part of the input speed signal stored in said memory for modifying the conditions of subsequent upshifting and/or clutch engagement.

3. The method of claim 1, further characterized by
    (a) upon downshifting of said transmission from a higher gear, storing in said memory the input speed signal at the time of said downshifting,
    (b) effecting compensating adjustments of said predetermined upper speed limit value and/or said upper clutch control speed input speed signal as a function in part of the signal stored in said memory for modifying the conditions of subsequent upshifting and/or clutch engagement.

4. The process of controlling an automatic transmission for a motor vehicle, wherein the transmission includes a hydrodynamic torque converter and a shiftable mechanism providing a plurality of input-output gear ratios, which comprises
    (a) sensing the output speed of the transmission and generating an output speed signal corresponding thereto,
    (b) sensing the drive input speed of the transmission and generating an input speed signal corresponding thereto,
    (c) comparing said input speed signal and said output speed signal, in relation to the momentary gear ratio of said transmission, and generating therefrom a slip signal representing the slippage within said transmission under momentary load,
    (d) comparing said slip signal with predetermined upper and lower slip limit values,
    (e) executing a downshift from a higher gear ratio when said slip exceeds the predetermined upper slip limit value,
    (f) comparing at least one of the output speed signal and input speed signal with predetermined upper and lower speed limit values,
    (g) executing an upshift from a lower gear ratio when said upper speed limit value is exceeded simultaneously with said slip being below said lower slip limit value,
    (h) executing a downshift from a higher gear ratio when the compared speed signal is below the lower speed limit value,
    (i) upon execution of a downshift, analyzing the conditions of operation relating to slip at the moment of downshift and deriving a comparative slip signal which is a function of said conditions of operation, (j) comparing said comparative slip signal to the slip signal generated by operation of the vehicle, and (k) causing a following upshift to be executed subject to a correspondence of said slip signal with said derived comparative slip signal.

5. The method according to claim 4, further characterized by (a) deriving said comparative slip signals according to conditions of operation corresponding to normal deceleration, overtaking or ascending, (b) said comparative slip signals for overtaking or ascending being smaller than the comparative slip signal derived for normal deceleration, whereby subsequent upshifting for overtaking or ascending requires a reduced degree of a slip.

6. The method according to claim 5, further characterized by (a) upon the concurrence of either (i) a negatively changig drive input speed or a negatively changing output speed and (ii) an absolute drive input speed below the level triggering a downshift or a negatively changing slip signal, a comparative slip signal is derived characteristic of normal deceleration.

7. The method according to claim 5, further characterized by (a) upon the concurrence of (i) a positively changing drive input speed or a positively changing output speed and (ii) an absolute drive input speed above the level triggering a downshift or a positively changing slip signal, a comparative slip signal is derived characteristic of overtaking.

8. The method according to claim 5, further charcterized by (a) upon the concurrence of (i) a negatively changing drive input or a negatively changing output speed and (ii) absolute drive input speed above the level triggering downshift or positively changing slip signal, a comparative slip signal is derived characteristic of ascending.

* * * * *